(12) United States Patent
Takahashi (10) Patent No.: US 9,815,334 B2
(45) Date of Patent: Nov. 14, 2017

(54) PNEUMATIC TIRE

(75) Inventor: Fumio Takahashi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 552 days.

(21) Appl. No.: 14/112,058

(22) PCT Filed: Apr. 26, 2012

(86) PCT No.: PCT/JP2012/002889
§ 371 (c)(1),
(2), (4) Date: Oct. 16, 2013

(87) PCT Pub. No.: WO2012/147356
PCT Pub. Date: Nov. 1, 2012

(65) Prior Publication Data
US 2014/0034207 A1  Feb. 6, 2014

(30) Foreign Application Priority Data

Apr. 26, 2011  (JP) .................................. 2011-098738

(51) Int. Cl.
*B60C 9/02*  (2006.01)
*B60C 13/00* (2006.01)
(Continued)

(52) U.S. Cl.
CPC .................. *B60C 9/02* (2013.01); *B60C 3/04* (2013.01); *B60C 9/0292* (2013.01); *B60C 9/28* (2013.01);
(Continued)

(58) Field of Classification Search
CPC .... B60C 3/00; B60C 3/04; B60C 9/02; B60C 9/0292; B60C 13/00; B60C 13/004
See application file for complete search history.

(56) References Cited

U.S. PATENT DOCUMENTS 2,047,859 A * 7/1936 Day ........................ B60C 23/18
152/153
4,387,758 A   6/1983 Matsuda et al.
(Continued)

FOREIGN PATENT DOCUMENTS

EP   1 066 988 A2   1/2001
EP   2 420 395 A1   2/2012
(Continued)

OTHER PUBLICATIONS

Extended European Search Report, dated Nov. 3, 2014, issued in European Patent Application No. 12776195.5.
(Continued)

*Primary Examiner* — Justin R Fischer
(74) *Attorney, Agent, or Firm* — Sughrue Mion, PLLC (57) ABSTRACT

The present invention aims to provide a pneumatic tire with sufficiently reduced rolling resistance. The pneumatic tire according to the present invention including a carcass having a carcass main portion extending from a tread portion via a sidewall portion to a bead portion in a toroidal shape and locked on a bead core embedded in the bead portion, and a belt disposed on a crown portion outer peripheral side of the carcass, characterized in that, when mounted on an applicable rim and put under a predetermined internal pressure no-load condition, a minimum value R1 of a curvature radius of a tire width direction cross-section in a tire radial direction outer portion of the carcass main portion positioned on an tire radial direction outer side than a position where a distance measured from a tire radial direction inner end of the carcass outwardly in the tire radial direction becomes ½ of a carcass cross-sectional height is 0.6 times or less of a minimum value R2 of the curvature radius of the tire width direction cross-section of a portion that, in the tire radial direction inner portion of the carcass main portion positioned on the tire radial direction inner side than the tire (Continued)

radial direction outer portion, bulges out in the tire width direction.

8 Claims, 3 Drawing Sheets

(51) Int. Cl.
  *B60C 9/28* (2006.01)
  *B60C 3/04* (2006.01)
  *B60C 9/20* (2006.01)

(52) U.S. Cl.
  CPC .... *B60C 13/004* (2013.01); *B60C 2009/2067* (2013.01); *B60C 2013/007* (2013.01); *B60C 2200/06* (2013.01); *Y10T 152/10855* (2015.01)

(56) References Cited

U.S. PATENT DOCUMENTS

| | | |
|---|---|---|
| 5,117,886 A | 6/1992 | Tokutake |
| 5,445,202 A * | 8/1995 | Nguyen .................. B60C 3/00 152/454 |
| 6,640,860 B1 * | 11/2003 | Metge .................. B60C 9/0292 152/454 |

FOREIGN PATENT DOCUMENTS

| | | |
|---|---|---|
| JP | 60-061305 A | 4/1985 |
| JP | 62-184902 A | 8/1987 |
| JP | 07-081310 A | 3/1995 |
| JP | 2000-158919 A | 6/2000 |
| JP | 2001-039112 A | 2/2001 |
| JP | 2001-287506 A | 10/2001 |
| JP | 2010-254205 A | 11/2010 |

OTHER PUBLICATIONS

Communication dated Nov. 25, 2014 from the Japanese Patent Office in counterpart application No. 2013-511939.
Communication dated Jun. 11, 2015 from the State Intellectual Property Office of the People's Republic of China in counterpart application No. 201280020178.1.
International Search Report for PCT/JP2012/002889 dated Jul. 24, 2012.

* cited by examiner

PNEUMATIC TIRE

CROSS REFERENCE TO RELATED APPLICATIONS

This is a National Stage of International Application No. PCT/JP2012/002889, filed Apr. 26, 2012, claiming priority from Japanese Patent Application No. 2011-098738, filed Apr. 26, 2011, the contents of all of which are incorporated herein by reference in their entirety.

TECHNICAL FIELD

The present invention relates to a pneumatic tire and, more particularly, to a pneumatic tire with reduced rolling resistance.

BACKGROUND ART

In recent years, in terms of economy and environmental considerations, fuel efficient tires have been required. As a means for obtaining such a fuel efficient tire, reducing the rolling resistance of the tire has been of interest.

Here, as a method of obtaining the fuel efficient tire by effectively reducing the rolling resistance, it has been proposed to reduce hysteresis loss which is a major cause of the rolling resistance. Specifically, as a method of obtaining the fuel efficient tire, it has been proposed to reduce the hysteresis loss (energy loss sometimes referred to also as "strain energy loss") caused for example by a change in a case shape of the tire during running.

As the fuel efficient tire that reduces rolling resistance by suppressing generation of the hysteresis loss caused by the change in the case shape of the tire, there has been suggested a tire having a carcass cross-sectional shape in a tire width direction having a non-natural equilibrium structure (for example, see Patent Literatures 1 and 2). More specifically, Patent Literatures 1 and 2, as the fuel efficient tire with reduced rolling resistance, disclose a pneumatic tire that, in a tire width direction cross-sectional view, has a curvature radius of the carcass positioned in a tire radial direction outer portion of a sidewall portion that is smaller than the curvature radius of the carcass in the natural equilibrium shape in the same position. According to the pneumatic tire described in Patent Literatures 1 and 2, by reducing the curvature radius in the tire radial direction outer portion of the sidewall portion, where energy loss under shear deformation is great but energy loss under bending deformation is small, reduces bending deformation during running in the tire radial direction inner portion of the sidewall portion where the energy loss under bending deformation is large (a portion close to a bead portion) so as to suppress generation of the hysteresis loss, thereby reducing the rolling resistance.

Here, the "natural equilibrium shape" means a shape of the carcass of a tire derived with reference to a known natural equilibrium shape theory, when the tire is mounted on an applicable rim and applying an internal pressure corresponding to a maximum load capacity defined by standards such as JATMA and the like, and generating no shearing strain and bending strain except a strain caused by tensile force on the carcass cord.

RELATED ART DOCUMENTS

Patent Documents

Patent Literature 1: Japanese Patent Application Laid-Open No. S60-61305

Patent Literature 2: Japanese Patent Application Laid-Open No. S62-184902

SUMMARY OF INVENTION

Technical Problem

However, the conventional pneumatic tire described above having the curvature radius of the carcass positioned in the tire radial direction outer portion of the sidewall portion smaller than the curvature radius of the carcass in the natural equilibrium shape in the same position has room for a further improvement in further reduction of the rolling resistance.

Accordingly, an object of the present invention is to provide a pneumatic tire with sufficiently reduced rolling resistance.

Solution to Problem

The present invention aims to advantageously solve the above problem. To that end, a pneumatic tire according to the present invention including a carcass having a carcass main portion extending in a toroidal shape from a tread portion via a pair of sidewall portions to a pair of bead portions and locked on bead cores embedded in the bead portions, and a belt composed of at least one belt layer disposed on an outer peripheral side of a crown portion of the carcass, characterized in that, in a state mounted on an applicable rim and put under a predetermined internal pressure no-load condition, a minimum value R1 of a curvature radius of a tire width direction cross-section of a tire radial direction outer portion of the carcass main portion positioned on a tire radial direction outer side than a position where a distance measured from a tire radial direction inner end of the carcass outwardly in a tire radial direction becomes ½ of a carcass cross-section height is 0.6 times or less of a minimum value R2 of a curvature radius of a tire width direction cross-section of a portion that, in a tire radial direction inner portion of the carcass main portion located on a tire radial direction inner side than the tire radial direction outer portion, bulges out in a tire width direction. When the minimum value R1 of the curvature radius of the tire radial direction outer portion of the carcass main portion is set to 0.6 times or less (0.6≥R1/R2) of the minimum value R2 of the curvature radius of the tire radial direction inner portion as described above, the tire radial direction outer portion of the carcass main portion easily bends to deform, while the tire radial direction inner portion is unlikely to bend to deform. Therefore, since the bending deformation near the bead portion having a large amount of rubber during running may be reduced, hysteresis loss may be reduced and thus rolling resistance of the tire may be reduced.

According to the present invention, the "applicable rim" refers to a rim defined by a valid industrial standard in the area where the tire is produced and used, and such standard is JATMA (Japan Automobile Tire Manufacturers Association) YEAR BOOK in Japan, ETRTO (European Tyre and Rim Technical Organization) STANDARD MANUAL in Europe, and TRA (THE TIRE and RIM ASSOCIATION INC.) YEAR BOOK in the United States. The "predetermined internal pressure no-load condition" refers to a condition in which the tire is mounted on the applicable rim and having an internal pressure of 70 kPa with no load (i.e., no load is applied). Also, the "height of the carcass cross-section" refers to a distance measured outwardly in the tire radial direction from a tire radial direction inner end position of the carcass to a tire radial direction outer end position. Further, the "curvature radius of the tire width direction cross-section of the carcass main portion" refers to a curvature radius of a tire width direction cross-section (curved line) of a virtual plane formed by connecting center axes of all carcass cords embedded in the carcass main portion. Incidentally, when the carcass is composed of a plurality of plies, the "carcass main portion" refers to the carcass main portion of the ply located on a tire innermost side.

Here, in the pneumatic tire of the present invention, a belt dimension in the tire width direction is preferably 0.75 times or less of a carcass dimension in the tire width direction. This is because, when the belt dimension in the tire width direction is set to 0.75 times or less of the carcass dimension in the tire width direction, a less amount of rubber of the tread portion is used, thereby the rolling resistance of the tire may be reduced.

Also, in the pneumatic tire according to the present invention, a minimum distance between a tire width direction outer end of the belt and the carcass main portion is preferably 7.5 mm or smaller. This is because, when the minimum distance between the tire width direction outer end of the belt and the carcass main portion is 7.5 mm or smaller, the tread portion may deform uniformly in the tire width direction when the internal pressure is applied, and thereby the tire may maintain a uniform shape during running. Also because, since a less amount of rubber is used, the rolling resistance of the tire may be reduced.

According to the pneumatic tire of the present invention, moreover, in a tire width direction cross-sectional view, the position where the curvature radius of the tire radial direction outer portion of the carcass main portion becomes the minimum value R1 is preferably located in a range of 10 mm or more outward in the tire width direction from a virtual line extending parallel to the tire radial direction through a tire width direction outer end of the belt. This is because, when the position where the curvature radius becomes the minimum value R1 is located in the range of 10 mm or more outward in the tire width direction from the virtual line extending parallel to the tire radial direction through the tire width direction outer end of the belt, the tread portion may deform uniformly in the tire width direction when the internal pressure is applied, and thereby the tire may maintain a uniform shape during running.

According to the pneumatic tire of the present invention, further, in the tire width direction cross-sectional view, the curvature radius of the carcass main portion located on a tire radial direction inner side of a belt end is preferably 1.5 times or more of the minimum value R1 of the curvature radius of the tire radial direction outer portion of the carcass main portion. This is because, when the curvature radius of the carcass main portion located on the inner side of the belt end in the tire radial direction is 1.5 times or more of the minimum value R1 of the curvature radius of the tire radial direction outer portion, the tread portion may deform uniformly in the tire width direction when the internal pressure is applied, and thereby the tire may maintain a uniform shape during running.

According to the present invention, the "carcass main portion located on the inner side of the belt end in the tire radial direction" refers to a portion of the carcass main portion located in a range of 5 mm or smaller in the tire width direction around an intersection of a vertical line extending from the belt end to the carcass and the carcass.

According to the pneumatic tire of the present invention, further, a distance measured along a direction perpendicular to the carcass main portion from the carcass main portion to a tire outer peripheral surface preferably becomes minimum at a position where the curvature radius becomes the minimum value R1 in the tire radial direction outer portion of the carcass main portion. When the position where the curvature radius becomes the minimum value R1 has a minimum thickness of rubber, the hysteresis loss by bending deformation may be further reduced, and thereby the rolling resistance of the tire may be further reduced.

According to the pneumatic tire of the present invention, also, it is preferable that, when the tire is mounted on an applicable rim and changed from a state under a predetermined internal pressure no-load condition to a state under a regular internal pressure applied condition, a tire outer contour of the tire width direction cross-section bulges out in the tire radial direction in the tread portion and, in an upper area of the sidewall portion, a portion located between two intersections, which appear when a tire outer contour under the predetermined internal pressure no-load condition and a tire outer contour under the regular internal pressure applied condition are superimposed, shifts inwardly in the tire width direction, while a tire outer contour in a lower area of the sidewall portion bulges out in the tire width direction.

According to the present invention, the "regular internal pressure" refers to an internal pressure corresponding to a maximum load capacity defined by standards such as JATMA and the like. Also, the "upper area of the sidewall portion" refers to a portion of the sidewall portion that is located outside of, in the tire radial direction, a virtual line extending parallel to the tire width direction through a position where a distance measured outwardly in the tire radial direction from the tire radial direction inner end of the carcass becomes ½ of a carcass cross-sectional height. The "lower area of the sidewall portion" refers to a portion of the sidewall portion that is located on an inner side than the upper area in the tire radial direction.

According to the pneumatic tire of the present invention, also, a recess is formed on a tire outer peripheral side of a portion located on the tire radial direction inner side than a position with a tire maximum width and, simultaneously, located on the tire radial direction outer side than a separating point of the tire which is mounted on the applicable rim and put under the predetermined internal pressure no-load condition and the applicable rim. This is because, when the recess is formed, weight of the tire is reduced and thereby the rolling resistance of the tire may be further reduced.

Effect of the Invention

According to the pneumatic tire of the present invention, the rolling resistance may be sufficiently reduced by reducing the hysteresis loss.

DESCRIPTION OF EMBODIMENTS

Figure 1:
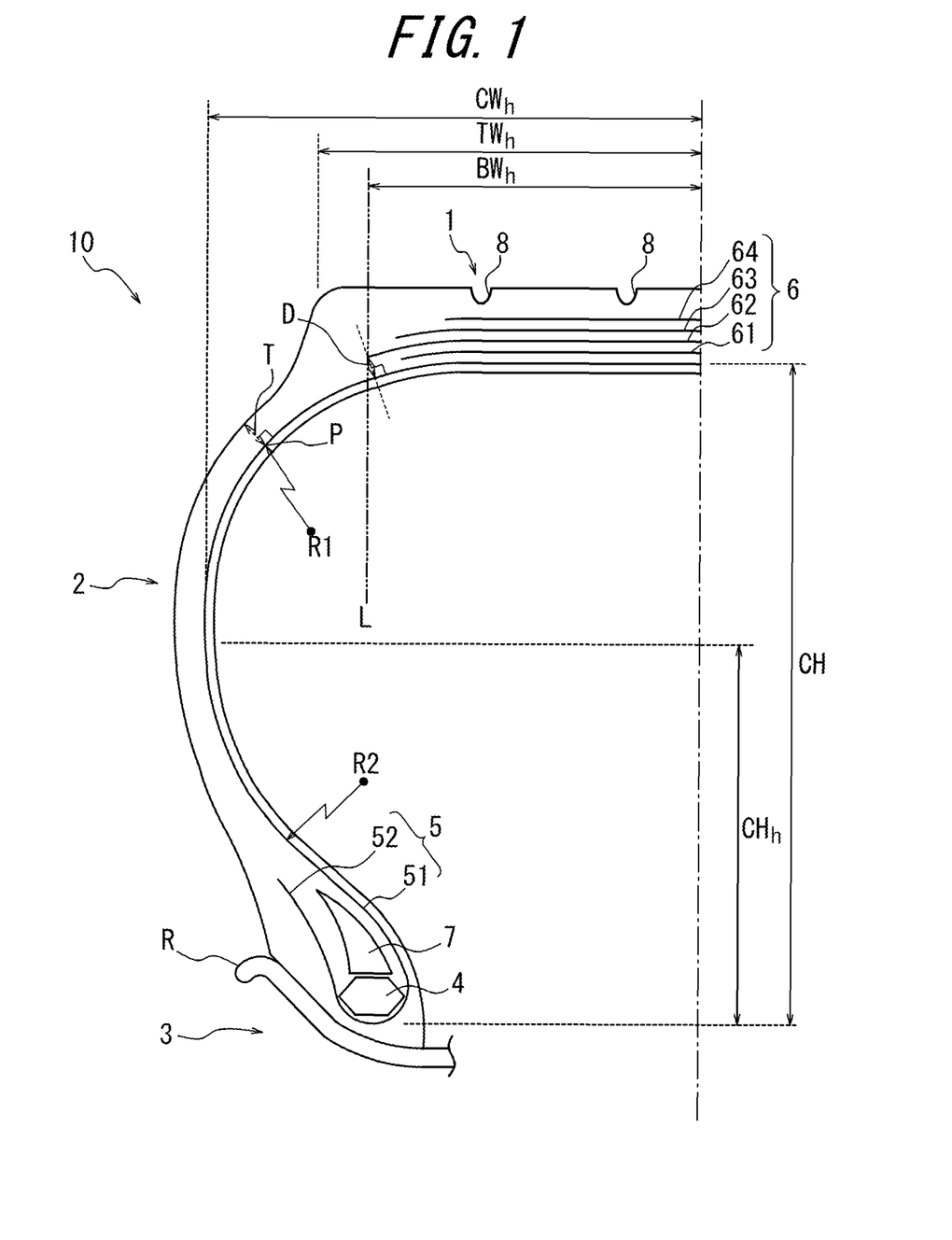
FIG. 1 is a tire width direction cross-sectional view of a half portion of a representative pneumatic tire according to the present invention mounted on an applicable rim.

The following is a detailed description of embodiments of the present invention with reference to the accompanying drawings. FIG. 1 is a diagram illustrating, as an example of a pneumatic tire according to the present invention, a tire width direction cross-section of a half portion of the tire mounted on an applicable rim R under a predetermined internal pressure no-load condition.

Here, a pneumatic tire 10 illustrated in FIG. 1 is a pneumatic tire suitable for heavy duty vehicles such as a bus and a truck. The pneumatic tire 10 includes a tread portion 1, a pair of sidewall portions 2 (only one of them is illustrated) extending inwardly in a tire radial direction from a side portion of the tread portion 1, and bead portions 3 (only one of them is illustrated) connected to a tire radial direction inner side of each sidewall portion 2. Note that the pneumatic tire according to the present invention is not limited to the pneumatic tires for the heavy duty vehicles but may be used as pneumatic tires for passenger cars.

The pneumatic tire 10 also includes a radial carcass 5 composed of one ply which is made up of carcass cords arranged parallel to each other and coated with rubber and, simultaneously, extending between a pair of bead portions 3. Here, the radial carcass 5 is composed of a carcass main portion 51 that extends toroidally from the tread portion 1 to the pair of bead portions 3 through the pair of sidewall portion 2 and is locked on a bead core 4 having a substantially hexagonal cross-section embedded in the bead portion 3, and a carcass folding portion 52 that extends from the carcass main portion 51 and folded back, around the bead core 4, from the tire radial direction inner side to a tire radial direction outer side. Although one carcass ply is illustrated in FIG. 1, the pneumatic tire according to the present invention may have two-ply or more, if necessary. According to the pneumatic tire of the present invention, also, a folding form of the carcass is not particularly limited but, for example, the carcass may be wrapped around the bead core.

Furthermore, on a tire radial direction outer side (an outer peripheral side of a crown portion) of the radial carcass 5 of the tread portion 1, a belt 6 composed of four belt layers 61, 62, 63 and 64 formed by a rubber-coated cord arranged at a predetermined angle relative to the tire circumferential direction is embedded. On a tire radial direction outer side of the belt 6, tread rubber is disposed, on the surface of which (i.e., on a road-contacting plane of the tread portion) a plurality of grooves 8 are formed. Although FIG. 1 illustrates the belt 6 composed of a total of four belt layers 61, 62, 63 and 64, the pneumatic tire according to the present invention may have any number of belt layers.

Further, on a tire radial direction outer side of the bead core 4 of the bead portion 3, a bead filler 7 having a substantially triangular cross-section that gradually decreases a thickness outwardly in the tire radial direction along the radial carcass 5 is disposed.

Here, in the pneumatic tire 10 illustrated in FIG. 1, at a tire radial direction outer portion of the carcass main portion 51, that is, in the carcass main portion 51, at a portion located on an outer side in the tire radial direction than a position where a distance measured from the tire radial direction inner end of the radial carcass 5 outwardly in the tire radial direction becomes a half of a carcass cross-sectional height ($CH_h$=CH/2, where "CH" is carcass cross-sectional height), a minimum value of a curvature radius is R1. In the pneumatic tire 10, further, at a part of the tire radial direction inner portion of the carcass main portion 51 that bulges out in the tire width direction, that is, at a part of the carcass main portion 51 that is located on an inner side in the tire radial direction than the tire radial direction outer portion and bulges out in the tire width direction, a minimum value of a curvature radius of the tire width direction cross-section is R2. The "part of the tire radial direction inner portion that bulges out in the tire width direction" corresponds to a part of the tire radial direction inner portion where a center of curvature is located on an inner side than the carcass main portion 51 in the tire width direction.

In the pneumatic tire 10, the minimum value R1 of the curvature radius of the tire radial direction outer portion of the carcass main portion 51 is 0.6 times or less ($0.6 \geq R1/R2$) of the minimum value R2 of the curvature radius of the part of the tire radial direction inner portion of the carcass main portion 51 that bulges out in the tire width direction.

Here, in the pneumatic tire, typically, a part of the carcass main portion having a smaller curvature radius (that is, a large curvature) has smaller rigidity against tension generated in the sidewall portion when the internal pressure is applied. That is, at a part of the carcass main portion having a small curvature radius, the sidewall portion easily bends to deform. Therefore, in the pneumatic tire 10, in an upper area of the sidewall portion 2 where the tire radial direction outside portion of the carcass main portion 51 having the minimum value R1 of the curvature radius which is 0.6 times or less of R2 is located, especially at a position P where the curvature radius of the carcass main portion 51 becomes the minimum value R1, folding deformation easily occurs during running. On the other hand, in the pneumatic tire 10, a lower area of the sidewall portion 2 where the tire radial direction inner portion of the carcass main portion 51 having the minimum value R2 of the curvature radius larger than R1 is located, folding deformation is unlikely to occur, comparing to the upper area of the sidewall portion 2.

Note that, since the curvature radius of the crown portion in the normal pneumatic tire is large, the position P is typically located in the sidewall portion.

Accordingly, during running, the pneumatic tire 10 heavily bends to deform in the upper area of the sidewall portion 2 where the thickness of rubber (a distance measured from the carcass main portion 51 to an outer surface of the tire along a direction perpendicular to the carcass main portion 51) is thin, while hardly bending to deform in the lower area of the side wall portion 2 where the thickness of rubber is thick (in particular, near the bead portion 3). That is, the upper area of the sidewall portion 2 where hysteresis loss during bending is unlikely to occur due to a small amount of rubber heavily bends to deform, while the lower area of the sidewall portion 2 where the hysteresis loss easily occurs in bending due to a large amount of rubber hardly bends to deform. Therefore, when viewing the pneumatic tire 10 as a whole, the hysteresis loss is reduced and the rolling resistance of the tire decreases.

Here, in the pneumatic tire 10, in terms of suppressing the occurrence of failures in the sidewall portion 2 by preventing heavy bending deformation of the sidewall portion 2 at a position where the curvature radius becomes the minimum value R1, R1 is preferably 0.04 times or more of R2 ($0.04 \leq R1/R2$). Further, in the pneumatic tire 10, in terms of reliably reducing the hysteresis loss in the whole tire by reliably reducing bending deformation in the lower area of the sidewall portion 2, R1 is preferably 0.4 times or less of R2 ($0.4 \geq R1/R2$).

Also, in the pneumatic tire 10, a tire width direction dimension BW ($2BW_h$) of the belt 6, i.e., a tire width direction dimension of the belt layer 62 having the largest tire width direction dimension is preferably 0.75 times or less of a tire width direction maximum dimension CW ($2CW_h$) of the radial carcass 5. In the pneumatic tire 10, further, a tread width TW ($2TW_h$) is preferably 0.77 times or less of the tire width direction maximum dimension CW of the radial carcass 5. This is because, when the tire width direction dimension BW of the belt 6 is 0.75 times or less of the tire width direction maximum dimension CW of the radial carcass 5, or when the tread width TW is 0.77 times or less of the tire width direction maximum dimension CW of the radial carcass 5, the tread portion 1 has a less amount of rubber and a calorific value of rubber in the tread portion 1 during running may be reduced, which enables reduction in the hysteresis loss and thus reduction in the rolling resistance of the tire.

In the pneumatic tire 10, in terms of further reducing the rolling resistance of the tire by further reducing the calorific value of the rubber in the tread portion 1 during running, the tire width direction dimension BW of the belt 6 is preferably 0.73 times or less of the tire width direction maximum dimension CW of the radial carcass 5. Also, the tread width TW is preferably 0.75 times or less of the tire width direction maximum dimension CW of the radial carcass 5. This is because, by reducing a volume of the tread rubber that deforms as sandwiched between the belt 6 and the road surface during running, the calorific value (hysteresis loss) of the tread rubber may be reduced. Note that, in general, the tire width direction maximum dimension BW of the belt 6 acting as a reinforcing layer varies in accordance with the tread width TW.

In the pneumatic tire 10, also, in terms of preventing from failing to sufficiently reduce the hysteresis loss due to a significant change of a shape of a contact patch, the tire width direction dimension BW of the belt 6 is preferably 0.70 times or more of the tire width direction maximum dimension CW of the radial carcass 5. Also, the tread width TW is preferably 0.72 times or more of the tire width direction maximum dimension CW of the radial carcass 5. When the shape of the contact patch changes significantly, heavy local deformation is caused at the tread portion 1 due to the local concentration of a ground contact pressure and large hysteresis loss occurs.

In the pneumatic tire 10, further, a minimum distance D between a tire width direction outer end of the belt 6, that is, a tire width direction outer end of the belt layer 62 having the largest tire width direction dimension and the carcass main portion 51 is preferably 7.5 mm or smaller. In other words, a length of a vertical line drawn from the tire width direction outer end of the belt 6 towards the carcass main portion 51 is preferably 7.5 mm or smaller. This is because, when the minimum distance D from the tire width direction outer end of the belt 6 to the carcass main portion 51 is 7.5 mm or smaller, the carcass main portion 51 positioned on the tire radial direction inner side of an end portion of the belt 6 may have a flat shape and, while a tire width direction cross-section of the radial carcass 5 is designed to have a smooth curve, the minimum value R1 of the curvature radius may be sufficiently reduced. Therefore, the tread portion 1 may deform uniformly in the tire width direction when the regular internal pressure is applied and thus the tire may maintain the uniform shape during running. It is also because the rolling resistance of the tire may be further reduced by reducing the amount of rubber in the tread portion 1. Incidentally, the vertical line drawn from the tire width direction outer end of the belt 6 towards the carcass main portion 51 refers to a vertical line drawn from a center axis of the cord located outermost in the tire width direction among the cords embedded in the belt 6 to a plane connecting center axes of the carcass cords embedded in the carcass main portion 51.

In the pneumatic tire 10, in terms of reliably maintaining the uniform shape of the tire during running by making deformation of the tread portion 1 further uniform when the regular internal pressure is applied, the minimum distance D is preferably 6.2 mm or smaller. In the pneumatic tire 10, also, in terms of suppressing a failure to occur between the radial carcass 5 and the belt 6, the minimum distance D is 4 mm or more.

In the pneumatic tire 10, also, a distance between the position P where the curvature radius of the tire radial direction outer portion of the carcass main portion 51 becomes the minimum value R1 and a virtual line L extending along the tire radial direction through the tire width direction outer end of the belt 6, when measured from the virtual line L outwardly in the tire width direction, is preferably 0.07 times or more (for example, 10 mm or more) of the tire width direction maximum dimension CW of the radial carcass 5, more preferably 0.1 times or more (for example, 15 mm or more) of the tire width direction maximum dimension CW of the radial carcass 5. This is because, when the distance from the virtual line L to the position P where the curvature radius becomes the minimum value R1 is 0.07 times or more (for example, 10 mm or more) of the tire width direction maximum dimension CW of the radial carcass 5, a sufficient distance between the position P where bending deformation easily occurs and the belt end may be ensured, and thereby suppressing bending, in a tire width direction end portion of the belt 6, inwardly in the tire radial direction when the regular internal pressure is applied. That is, it is because, by promoting uniform deformation of the tread portion 1 in the tire width direction when the regular internal pressure is applied, the uniform shape of the tire may be maintained during running.

Further, in the pneumatic tire 10, the curvature radius of the carcass main portion 51 positioned on the tire radial direction inner side of the end of the belt 6, that is, the curvature radius of the carcass main portion 51 in a range of 5 mm in the tire width direction on both sides around an intersection of the vertical line extending from the edge of the belt 6 to the carcass main portion 51 and the carcass main portion 51 is preferably 1.5 times or more of the minimum value R1 of the curvature radius on the tire radial direction outer portion of the carcass main portion 51. This is because, when the curvature radius of the carcass main portion 51 positioned on the tire radial direction inner side of the end of the belt 6 is 1.5 times or more of R1, the tire width direction end portion of the belt 6 may be prevented from bending inwardly in the tire radial direction when the regular internal pressure is applied. That is, it is because, by uniforming the deformation of the tread portion 1 in the tire width direction when the regular internal pressure is applied, the uniform shape of the tire may be maintained during running.

In the pneumatic tire 10, also, the thickness of rubber preferably becomes minimum at the position P where the curvature radius of the tire radial direction outer portion of the carcass main portion 51 becomes the minimum value R1. This is because, when the thickness of rubber at the position P positioned in the upper area of the sidewall portion 2 is smallest in the entire tire, the bending deformation is promoted at the position P during running, therefore the lower area of the sidewall portion 2 where having a large amount of rubber and likely to cause the hysteresis loss at bending becomes further less likely to bend to deform. That is, when viewing the pneumatic tire 10 as a whole, the hysteresis loss is further reduced and the rolling resistance of the tire decreases further.

In the pneumatic tire 10, further, the minimum value R1 of the curvature radius of the tire radial direction outer portion of the carcass main portion 51 is preferably 28 mm or larger, more preferably 47 mm or smaller. This is because, when the minimum value R1 of the curvature radius is 28 mm or larger, the pneumatic tire may be easily produced and, simultaneously, has a sufficiently smooth shape. Also, when the minimum value R1 of the curvature radius is 47 mm or smaller, at the position P where the curvature radius becomes the minimum value R1, tension of the carcass may be sufficiently reduced and the carcass may be locally deformed when a load is applied. Thereby, deformation of the other areas may be subdued and the rolling resistance of the whole tire may be sufficiently reduced.

In the pneumatic tire 10, further, the minimum value R2 of the curvature radius of a portion that, in the tire radial direction inner portion of the carcass main portion 51, bulges out in the tire width direction is preferably 78 mm or larger. When the minimum value R2 of the curvature radius is 78 mm or larger, bending deformation in the lower area of the sidewall portion 2 may be reliably reduced and thereby the hysteresis loss in the whole tire may be reliably reduced. Note that, by increasing the minimum value R2 of the curvature radius as large as possible, carcass tension at the position where the curvature radius becomes the minimum value R2 when the internal pressure is applied increases and, as a result, deformation at this position may be suppressed, sufficiently reducing the rolling resistance.

Figure 2:
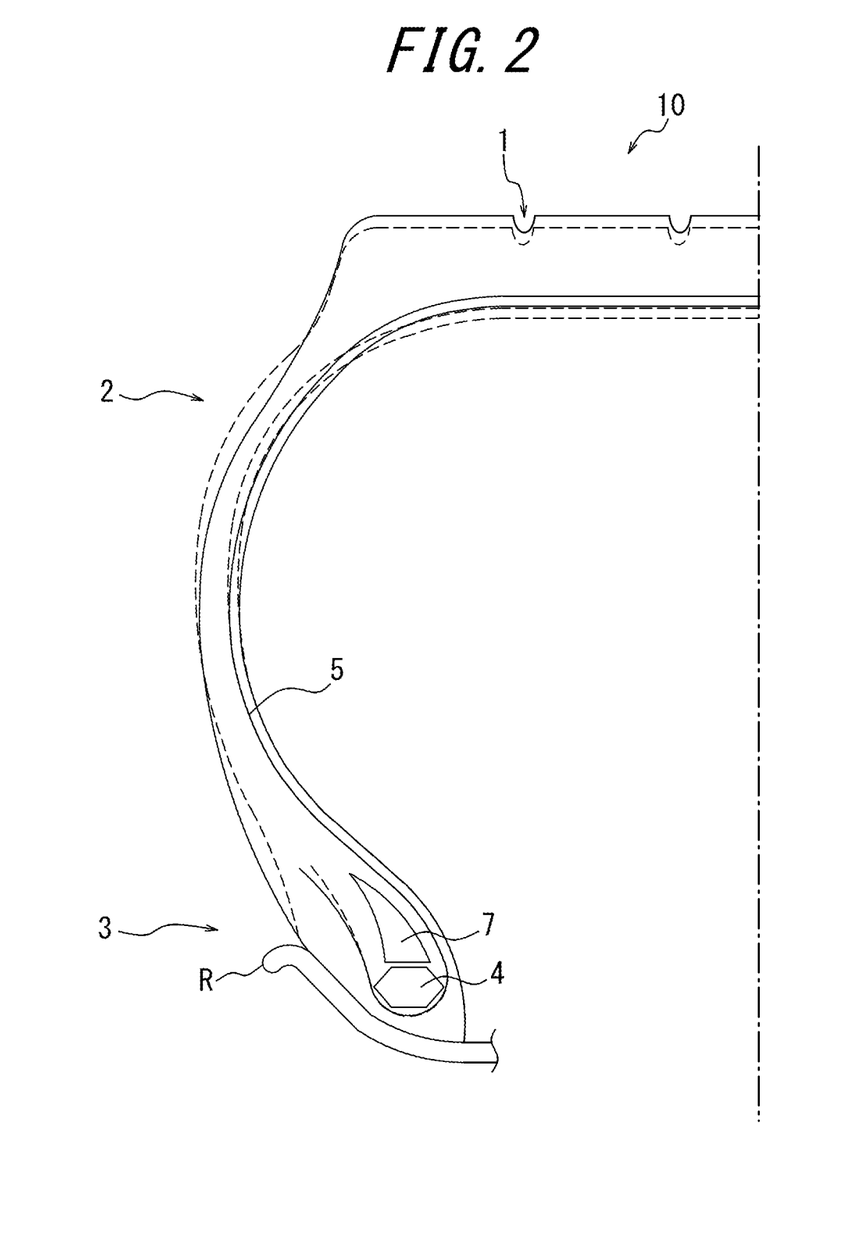
FIG. 2 is a diagram illustrating a change in a shape of a tire width direction cross-section when a regular internal pressure is applied to the pneumatic tire illustrated in FIG. 1; broken lines indicate a shape of the tire width direction cross-section before application of the regular internal pressure, and solid lines indicate a shape of the tire width direction cross-section after application of the regular internal pressure.

In the pneumatic tire 10 having the structure described above, when the tire is mounted on the applicable rim R and the condition is changed from the predetermined internal pressure no-load condition to the regular internal pressure applied condition, a shape of the tire width direction cross-section changes from a shape indicated by broken lines to a shape indicated by solid lines as illustrated in FIG. 2. Specifically, an outer contour of the tire width direction cross-section bulges out in the tire radial direction in the tread portion 1, especially at least in an area of the crown portion of the tread portion 1 having the belt 6 disposed therein. Also, in the upper area of the sidewall portion 2, a portion located between the two intersections, which appear when the tire outer contour under the predetermined internal pressure no-load condition and the tire outer contour when the regular internal pressure is applied are superimposed, shifts inwardly in the tire width direction. Further, in the lower area of the sidewall portion 2, the tire outer contour bulges out in the tire width direction. Note that the belt 6 is omitted in FIG. 2.

Figure 3:
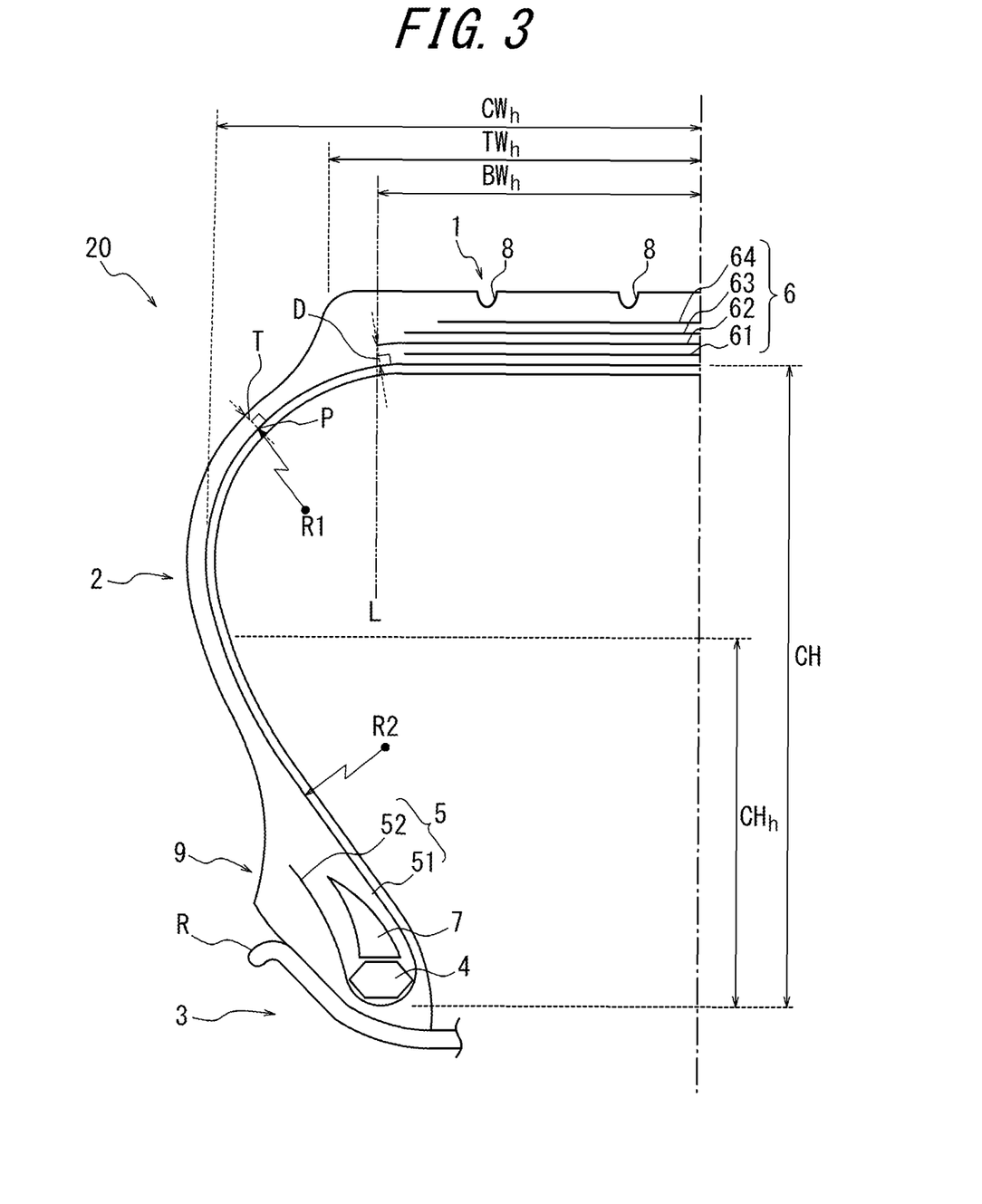
FIG. 3 is a tire width direction cross-sectional view of a half portion of another pneumatic tire according to the present invention mounted on an applicable rim.

Next, FIG. 3 illustrates a tire width direction cross-section of a half portion of a pneumatic tire according to another example of the present invention mounted on the applicable rim R under the predetermined internal pressure no-load condition.

A pneumatic tire 20 illustrated in FIG. 3 has a structure similar to the pneumatic tire according to a previous example, except that a recess 9 in the hollow shape is formed on the tire radial direction inner side than a position with a tire maximum width and, simultaneously, on a tire outer peripheral side of a part of the side wall portion 2 positioned on the tire radial direction outer side than a separating point of the tire and the applicable rim R. Note that, in FIG. 3, the same reference numerals are assigned to components having the same structures of those of the pneumatic tire 10 illustrated in FIG. 1.

The pneumatic tire 20, in the same manner as the pneumatic tire 10 according to the previous example, may reduce the rolling resistance of the tire, as well as maintaining the uniform shape during running.

Further, since the pneumatic tire 20 has the recess 9 formed thereon, the weight of the tire is reduced, thereby further reducing the rolling resistance of the tire. Note that, in the pneumatic tire 20, since the minimum value R2 of the curvature radius of a portion that, in the tire radial direction inner portion of the carcass main portion 51, bulges out in the tire width direction is larger than the minimum value R1 of the curvature radius of the tire radial direction outer portion, when viewing from the cross-section in the tire width direction, an angle of an extending direction of the carcass main portion 51 of the radial carcass 5 is relatively small with respect to the tire radial direction. Therefore, the pneumatic tire 20 may reduce significant amount of rubber at the recess 9.

Although the embodiments of the present invention have been described above with reference to the drawings, the pneumatic tire according to the present invention is not limited to either one of the examples described above but may be changed appropriately.

EXAMPLES

The following is a further detailed description of the present invention using examples. However, the present invention is not limited to them in any manner.

Example 1

With specifications shown in Table 1, a pneumatic tire (size: 295/75R22.5) having a structure illustrated in FIG. 1 was experimentally produced. Then, performance was evaluated by the following methods. Results are shown in Table 1.

Conventional Example 1

Except that the specification was changed as shown in Table 1, a pneumatic tire was produced in the same manner as Example 1, and performance was evaluated in the same manner as Example 1. Results are shown in Table 1.

Example 2

Except that the specification was changed as shown in Table 1, a pneumatic tire was produced in the same manner as Example 1, and performance was evaluated in the same manner as Example 1. Results are shown in Table 1.

Examples 3-9

With specifications shown in Table 2, a pneumatic tire (size: 295/75R22.5) having a structure illustrated in FIG. 3 was experimentally produced. Then, performance was evaluated in the same manner as Example 1. Results are shown in Table 2.

Comparative Examples 1-2

Except that the specification was changed as shown in Table 1, a pneumatic tire was produced in the same manner as Example 1, and performance was evaluated in the same manner as Example 1. Results are shown in Table 1.

Comparative Example 3

Except that the specification was changed as shown in Table 2, a pneumatic tire was produced in the same manner as Example 3, and performance was evaluated in the same manner as Example 3. Results are shown in Table 2.

<Rolling Resistance>

The produced tire was mounted on a rim of 8.25×22.5 in size and, by using a drum test machine having a steel plate surface of 1.7 m in diameter, a drum running test was conducted under a condition with an air pressure at 660 kPa, a load at 1800 kg and a speed at 80 km/h, so as to obtain the rolling resistance. Then, an index was evaluated with respect to the rolling resistance of Conventional Example 1, which is set to 100. The smaller the index is, the smaller the rolling resistance is. When there is a difference of 5 or more, it may be said that there is a significant difference. When there is a difference of 10 or more, it may be said that there is a highly significant difference. Note that it is usually very difficult to obtain a difference of 5 or more simply by adjusting the shape of the carcass. Further, it is generally difficult to achieve both of the reduction in the rolling resistance and equalization of a deformation distribution when the internal pressure was applied.

<Deformation on Application of Internal Pressure>

The produced tire was mounted on the rim of 8.25×22.5 in size, followed by application of an air pressure at 660 kPa. Then, a ratio of a change amount of a tire outer diameter in a tread end position due to the application of the internal pressure to a change amount of the tire outer diameter in a tread center (a tire equatorial plane) due to the application of the internal pressure (a tire diameter change amount (mm) in the tread end position due to the internal pressure/a tire diameter change amount in the tread center (mm) due to the internal pressure) was obtained. The closer to 1.0 the ratio is, the more uniform the deformation of the tread portion is when the internal pressure was applied. When there is a difference of about 0.02 in the ratios, it may be said that there is a significant difference.

TABLE 1

|  | Conventional Example 1 | Comparative Example 1 | Comparative Example 2 | Example 1 | Example 2 |
|---|---|---|---|---|---|
| Tire Structure | FIG. 1 | FIG. 1 | FIG. 1 | FIG. 1 | FIG. 1 |
| Minimum Curvature Radius R1 of Tire Radial Direction Outer Portion [mm] | 60 | 50 | 48 | 47 | 42 |
| Minimum Curvature Radius R2 of Tire Radial Direction Inner Portion [mm] | 65 | 75 | 77 | 78 | 80 |
| R1/R2 [-] | 0.92 | 0.67 | 0.62 | 0.60 | 0.53 |
| Belt Dimension BW in Tire Width Direction [mm] | 106 | 105 | 105 | 104 | 104 |
| Carcass Maximum Dimension CW in Tire Width Direction [mm] | 139 | 139 | 139 | 139 | 139 |
| Tread Width TW [mm] | 109 | 108 | 108 | 107 | 107 |
| BW/CW [-] | 0.76 | 0.76 | 0.76 | 0.75 | 0.75 |
| TW/CW [-] | 0.78 | 0.78 | 0.78 | 0.77 | 0.77 |
| Distance D [mm] | 8.5 | 8.0 | 7.8 | 7.7 | 7.5 |
| Distance from Belt End to Position P [mm] | 5 | 9 | 11 | 13 | 15 |
| Rolling Resistance | 100 | 97 | 96 | 95 | 94 |
| Deformation on Application of Internal Pressure | 0.95 | 0.97 | 0.97 | 0.97 | 0.98 |

TABLE 2

|  | Comparative Example 3 | Example 3 | Example 4 | Example 5 | Example 6 | Example 7 | Example 8 | Example 9 |
|---|---|---|---|---|---|---|---|---|
| Tire Structure | FIG. 3 | FIG. 3 | FIG. 3 | FIG. 3 | FIG. 3 | FIG. 3 | FIG. 3 | FIG. 3 |
| Minimum Curvature Radius R1 of Tire Radial Direction Outer Portion [mm] | 48 | 38 | 35 | 35 | 28 | 28 | 42 | 28 |
| Minimum Curvature Radius R2 of Tire Radial Direction Inner Portion [mm] | 77 | 100 | 300 | 500 | 800 | 800 | 80 | 800 |
| R1/R2 [-] | 0.62 | 0.38 | 0.12 | 0.07 | 0.04 | 0.04 | 0.53 | 0.04 |
| Belt Dimension BW in Tire Width Direction [mm] | 105 | 102 | 101 | 100 | 100 | 98 | 104 | 96 |
| Carcass Maximum Dimension CW in Tire Width Direction [mm] | 139 | 139 | 139 | 139 | 139 | 139 | 139 | 139 |

TABLE 2-continued

|  | Comparative Example 3 | Example 3 | Example 4 | Example 5 | Example 6 | Example 7 | Example 8 | Example 9 |
|---|---|---|---|---|---|---|---|---|
| Tread Width TW [mm] | 108 | 105 | 104 | 103 | 101 | 101 | 107 | 101 |
| BW/CW [—] | 0.76 | 0.73 | 0.73 | 0.72 | 0.72 | 0.71 | 0.75 | 0.69 |
| TW/CW [—] | 0.78 | 0.76 | 0.75 | 0.74 | 0.73 | 0.73 | 0.77 | 0.73 |
| Distance D [mm] | 7.8 | 6.2 | 6.0 | 5.5 | 4.0 | 4.0 | 7.5 | 4.0 |
| Distance from Belt End to Position P [mm] | 11 | 24 | 25 | 24 | 26 | 26 | 15 | 28 |
| Rolling Resistance | 96 | 92 | 91 | 89 | 86 | 85 | 94 | 86 |
| Deformation on Application of Internal Pressure | 0.97 | 1.02 | 1.00 | 0.99 | 1.01 | 1.02 | 0.98 | 1.04 |

From Tables 1 and 2, it can be seen that the tires of Examples 1 to 9 have smaller rolling resistance than that of the tires of Conventional Example 1 and Comparative Examples 1 to 3. It can also be seen that the tires of Examples 2 to 9 deform uniformly when the internal pressure was applied, comparing to the tires of Example 1 and Comparative Examples 1 to 3. It can be seen that, in particular, the tires of Examples 6 and 7 deform uniformly when the internal pressure was applied, comparing to the tire of Example 9.

INDUSTRIAL APPLICABILITY

According to the present invention, the pneumatic tire with sufficiently reduced rolling resistance may be provided.

REFERENCE SIGNS LIST

1 tread portion
2 sidewall portion
3 bead portion
4 bead core
5 radial carcass
6 belt
7 bead filler
8 groove
9 recess
10 pneumatic tire
20 pneumatic tire
51 carcass main portion
52 carcass folding portion
61, 62, 63, 64 belt layer

The invention claimed is:
1. A pneumatic tire comprising:
a carcass having a carcass main portion extending in a toroidal shape from a tread portion via a pair of sidewall portions to a pair of bead portions and locked on bead cores embedded in the bead portions; and
a belt comprising at least one belt layer disposed on an outer peripheral side of a crown portion of the carcass, wherein:
the following relationship is met in a state where the tire is mounted on an applicable rim and put under a predetermined internal pressure no-load condition,

$0.44 \geq R1/R2$, where R1 corresponds to a minimum value of a first curvature radius of a tire width direction cross-section of a tire radial direction outer portion of the carcass main portion and R2 corresponds to a minimum value of a second curvature radius of a tire radial direction inner portion of the carcass main portion located on a tire radial direction inner side than the tire radial direction outer portion and bulging out in a tire width direction,
the tire radial direction outer portion is positioned on a tire radial direction outer side than a position where a distance measured from a tire radial direction inner end of the carcass outwardly in a tire radial direction becomes ½ of a carcass cross-section height,
R2 is greater than or equal to 80 mm and less than or equal to 800 mm,
a minimum distance between a tire width direction outer end of the belt and the carcass main portion is greater than or equal to 4 mm and less than or equal to 7.5 mm, wherein the end of the belt is an end of a widest one of the at least one belt layer in the tire width direction,
in the tire width direction cross-sectional view, the curvature radius of the carcass main portion located on a tire radial direction inner side of a belt end is 1.5 times or more of the minimum value R1 of the curvature radius of the tire radial direction outer portion of the carcass main portion, wherein the carcass main portion located on the tire radial direction inner side of the belt end in the tire radial direction is a portion of the carcass main portion located in a range of 5 mm or smaller in the tire width direction around an intersection of a vertical line extending from the belt end to the carcass and the carcass,
wherein the tread portion has a flat outer surface,
wherein a point P of the carcass main portion is located at an outer side of an edge of the tread portion in the tire width direction, the point P corresponding to a position where the curvature radius of the carcass main portion becomes the minimum value R1,
wherein a width of the at least one belt layer in the tire width direction is smaller than a width of the tread portion in the tire width direction,
wherein a distance between the carcass and an outermost tire surface, measured in a direction parallel with an equatorial plane of the tire along the tire radial direction, decreases from a tread outermost edge to the point P, and
wherein in the tire width direction cross-section of the tire, the tire includes a concave surface between the tread outermost edge to the point P, the concave surface having a center of radius of curvature being at an outer side of the tire.

2. The pneumatic tire according to claim 1, wherein a belt dimension in the tire width direction is 0.75 times or less of a carcass dimension in the tire width direction.

3. The pneumatic tire according to claim 1, wherein, in a tire width direction cross-sectional view, the position where the curvature radius of the tire radial direction outer portion of the carcass main portion becomes the minimum value R1 is located in a range of 10 mm or more outward in the tire width direction from a virtual line extending parallel to the tire radial direction through a tire width direction outer end of the belt.

4. The pneumatic tire according to claim 1, wherein a distance measured along a direction perpendicular to the carcass main portion from the carcass main portion to a tire peripheral surface becomes minimum at a position where the curvature radius becomes the minimum value R1 in the tire radial direction outer portion of the carcass main portion.

5. The pneumatic tire according to claim 1, wherein, when the tire is mounted on an applicable rim and changed from a state under a predetermined internal pressure no-load condition to a state under a regular internal pressure applied condition,
 a tire outer contour of the tire width direction cross-section bulges out in the tire radial direction in the tread portion,
 in an upper area of the sidewall portion, a portion located between two intersections, which appear when the tire outer contour under the predetermined internal pressure no-load condition and the tire outer contour under the regular internal pressure applied condition are superimposed, shifts inwardly in the tire width direction, and
 in a lower area of the sidewall portion, the tire outer contour bulges out in the tire width direction.

6. The pneumatic tire according to claim 1, wherein a recess is formed on a tire outer peripheral side of a portion located on the tire radial direction inner side than a position with a tire maximum width and, simultaneously, located on the tire radial direction outer side than a separating point of the tire which is mounted on the applicable rim and put under the predetermined internal pressure no-load condition and the applicable rim.

7. The pneumatic tire according to claim 1, wherein the following condition is met:

0.44>$R1/R2$.

8. The pneumatic tire according to claim 1, wherein the at least one belt layer comprises a plurality of belt layers, and
 wherein a width of each of the plurality of belt layers in the tire width direction is smaller than the width of the tread portion in the tire width direction.

* * * * *